United States Patent
Ogiwara

(10) Patent No.: US 9,525,494 B2
(45) Date of Patent: Dec. 20, 2016

(54) OPTICAL RECEIVER AND FREQUENCY OFFSET CORRECTION METHOD

(71) Applicant: FUJITSU LIMITED, Kawasaki-shi, Kanagawa (JP)

(72) Inventor: Hiroshi Ogiwara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 91 days.

(21) Appl. No.: 14/186,647

(22) Filed: Feb. 21, 2014

(65) Prior Publication Data

US 2014/0286650 A1    Sep. 25, 2014

(30) Foreign Application Priority Data

Mar. 21, 2013  (JP) .................................. 2013-058653

(51) Int. Cl.
  *H04B 10/61* (2013.01)
(52) U.S. Cl.
  CPC .................................. *H04B 10/6164* (2013.01)
(58) Field of Classification Search
  CPC ........................ H04L 27/2659; H04B 10/6164
  See application file for complete search history.

(56) References Cited

U.S. PATENT DOCUMENTS

| | | | |
|---|---|---|---|
| 5,909,148 A | 6/1999 | Tanaka | |
| 2004/0252795 A1 | 12/2004 | Hosokawa | |
| 2009/0142076 A1* | 6/2009 | Li | H04B 10/61 |
| | | | 398/208 |
| 2009/0245815 A1 | 10/2009 | Zhang et al. | |
| 2009/0305642 A1* | 12/2009 | Ezaki | G01S 11/10 |
| | | | 455/67.13 |
| 2011/0255877 A1 | 10/2011 | Nakashima et al. | |

(Continued)

FOREIGN PATENT DOCUMENTS

| | | |
|---|---|---|
| JP | 09-74431 | 3/1997 |
| JP | 2004-328462 | 11/2004 |

(Continued)

OTHER PUBLICATIONS

Leven, Andreas et al., "Frequency Estimation in Intradyne Reception", IEEE Photonics Technology Letters, vol. 19, No. 6, Mar. 15, 2007, pp. 366-368.

(Continued)

*Primary Examiner* — Shi K Li
*Assistant Examiner* — Mina Shalaby
(74) *Attorney, Agent, or Firm* — Fujitsu Patent Center

(57) ABSTRACT

An optical receiver includes: a frontend circuit configured to generate a baseband signal representing a received optical signal by using local oscillator light; a frequency offset estimator configured to estimate a frequency offset of the baseband signal; a frequency offset corrector configured to correct the frequency offset of the baseband signal according to an estimation result by the frequency offset estimator; a phase recovery configured to recover a modulated phase from the baseband signal for which the frequency offset is corrected; a data recovery configured to recover transmission data according to the modulated phase recovered by the phase recovery; and a controller configured to control an operation of the frequency offset estimator according to a phase error of the baseband signal for which the frequency offset is corrected.

5 Claims, 15 Drawing Sheets

(56) References Cited

U.S. PATENT DOCUMENTS

2012/0155890 A1* 6/2012 Zhou .................. H04B 10/6165
398/208
2013/0251369 A1 9/2013 Ogasahara

FOREIGN PATENT DOCUMENTS

| JP | 2009-253971 | 10/2009 |
| JP | 2011-228819 | 11/2011 |
| JP | 2012-528491 | 11/2012 |
| WO | 2010/135868 A1 | 12/2010 |
| WO | 2012/111847 A1 | 8/2012 |

OTHER PUBLICATIONS

Nakashima, Hisao et al., "Novel Wide-range Frequency Offset Compensator Demonstrated with Real-time Digital Coherent Receiver", ECOC 2008, Sep. 21-25, 2008, pp. vol. 1-39-1-40.

JPOA—Japanese Office Action issued on Oct. 11, 2016 for corresponding Japanese Patent Application No. 2013-058653, with English translation of relevant part page3, lines 4-35.

L. Li et al., "Adaptive Optimization for Digital Carrier Phase Estimation in Optical Coherent Receivers", 2008 Digest of the IEEE/Leos Summer Topical Meetings, pp. 121-122.

* cited by examiner

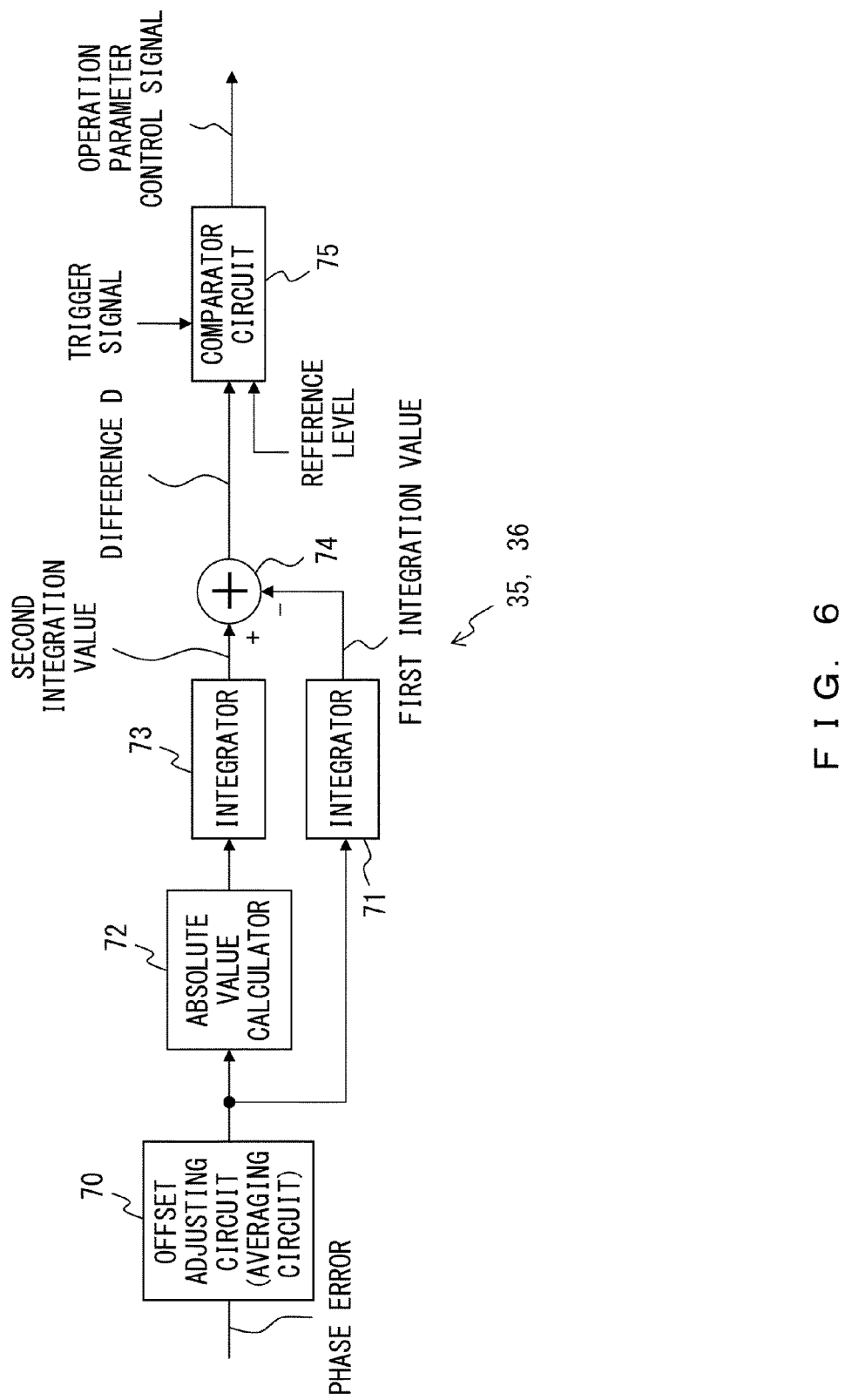
F I G. 6

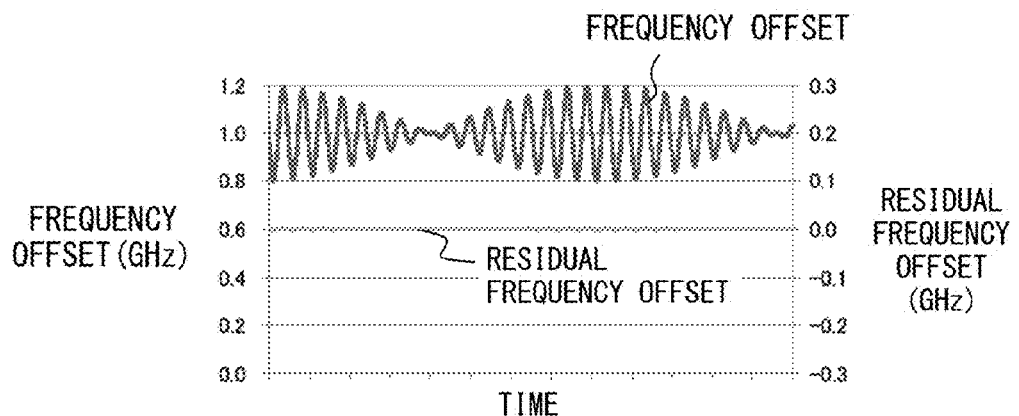
F I G. 7 A
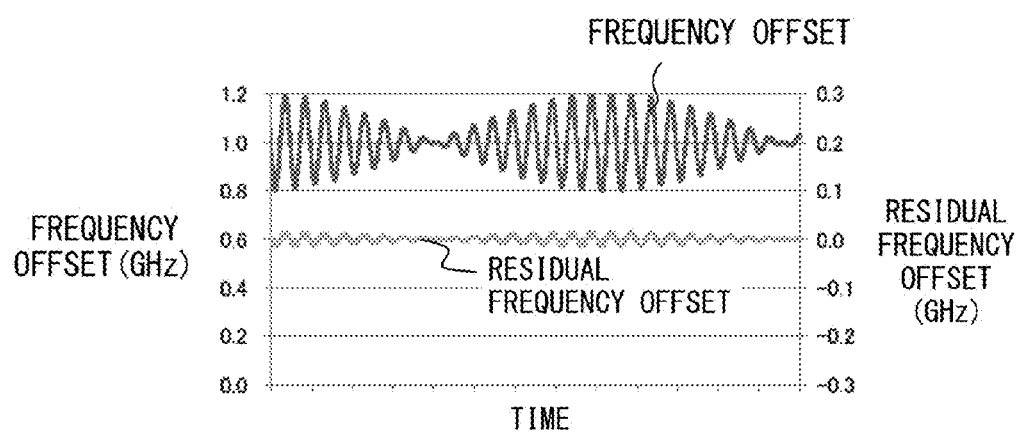
F I G. 7 B
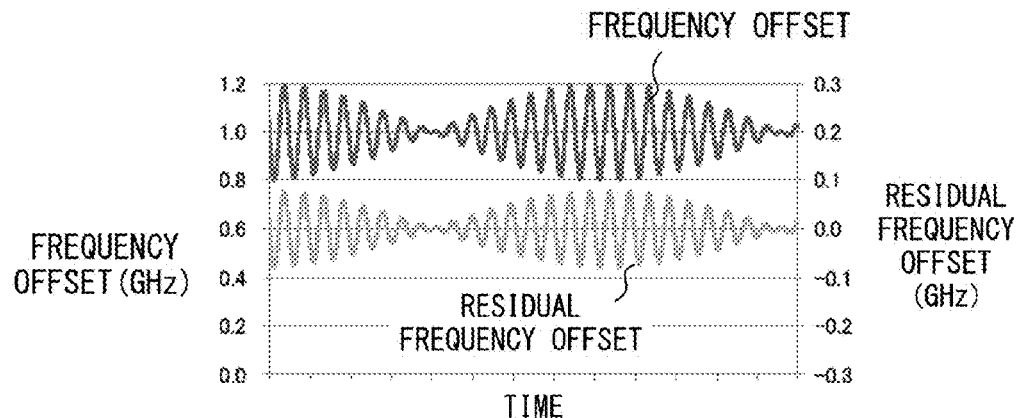
F I G. 7 C

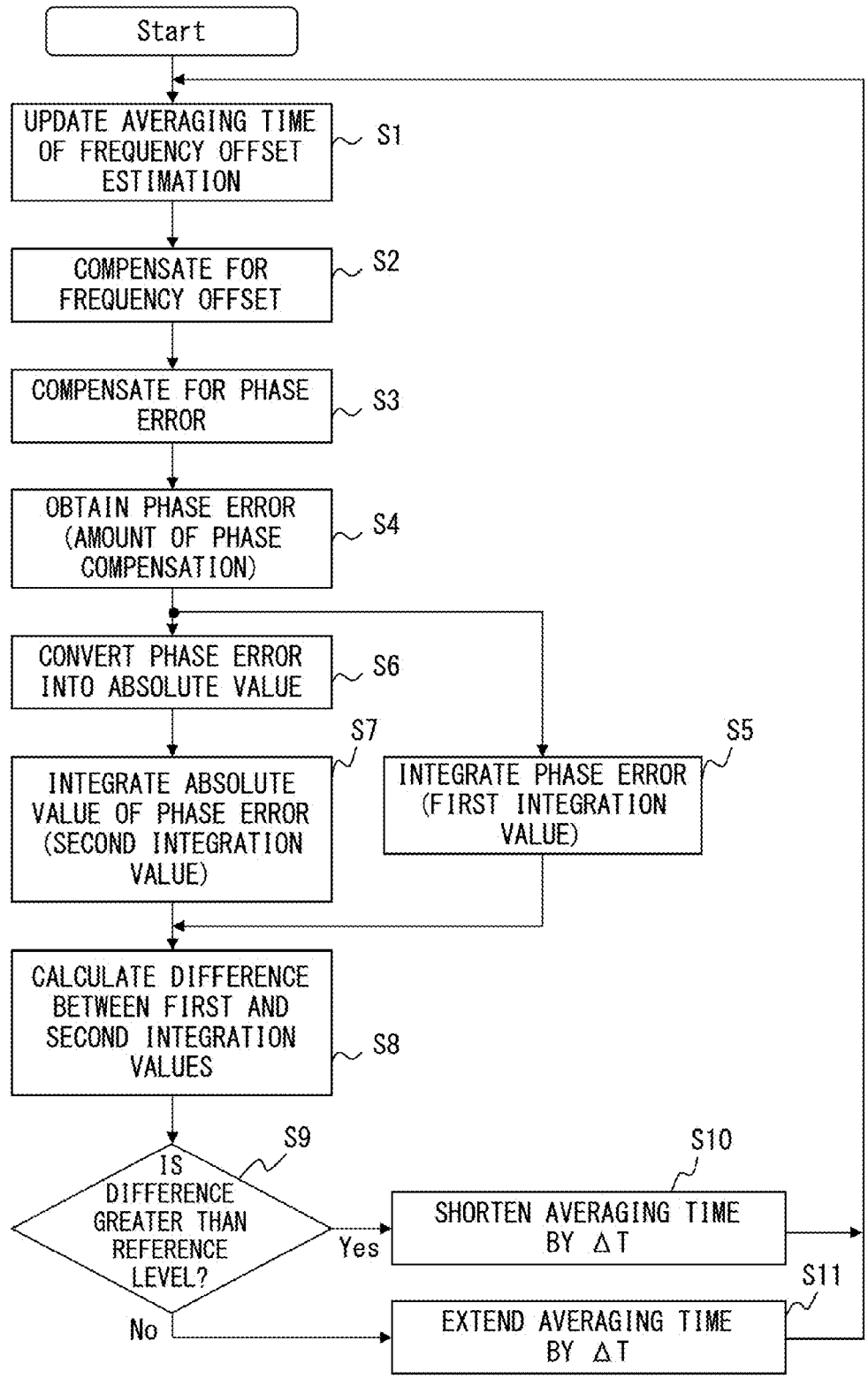
F I G. 1 0

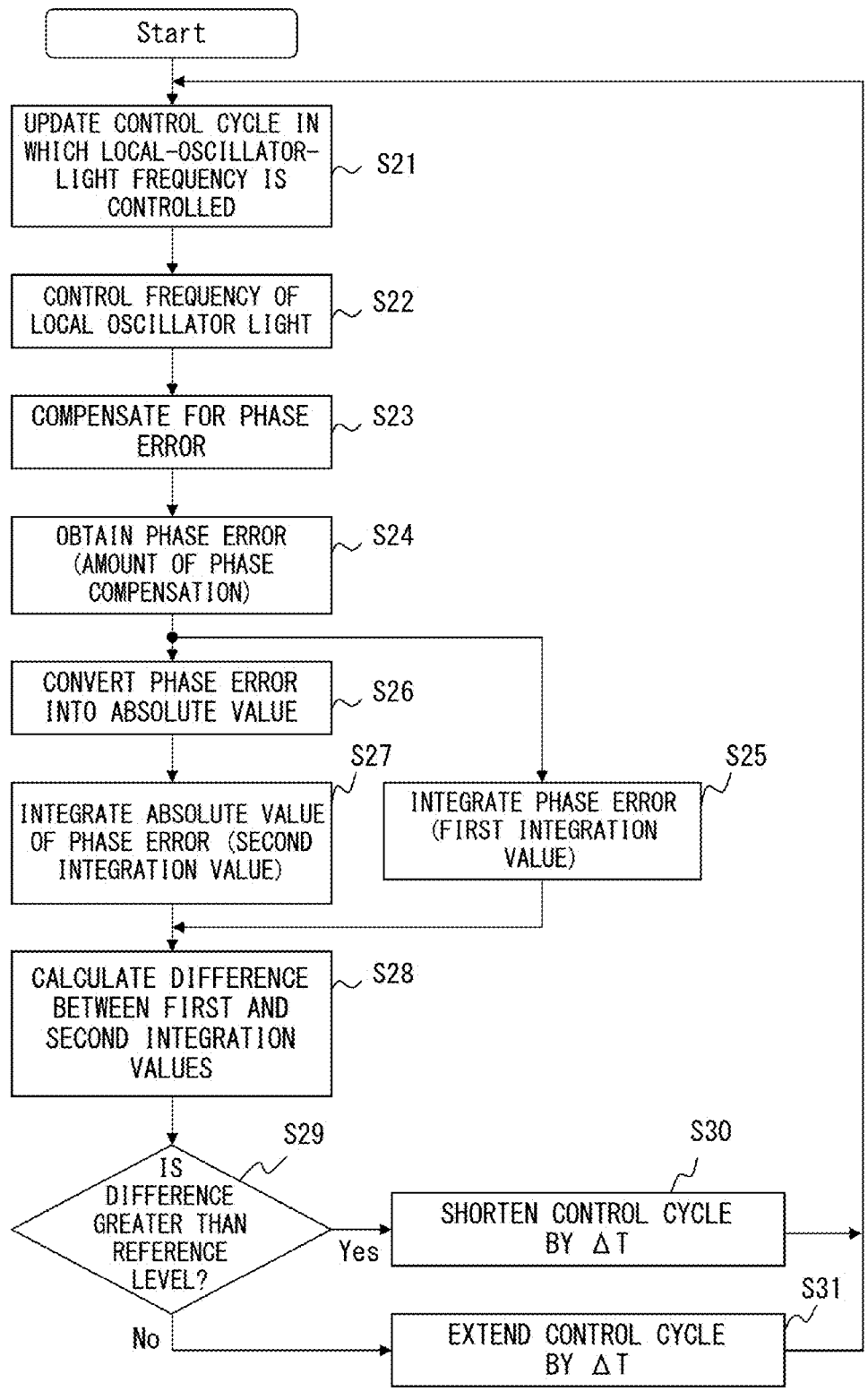
F I G. 1 3

OPTICAL RECEIVER AND FREQUENCY OFFSET CORRECTION METHOD

CROSS-REFERENCE TO RELATED APPLICATION

This application is based upon and claims the benefit of priority of the prior Japanese Patent Application No. 2013-058653, filed on Mar. 21, 2013, the entire contents of which are incorporated herein by reference.

FIELD

The embodiments discussed herein are related to an optical receiver and a frequency offset correction method.

BACKGROUND

In an optical communication system, coherent detection has various advantages in comparison with conventional intensity modulation direct detection or phase modulation delay interference detection. For example, using digital signal processing, coherent detection allows a low signal-to-noise ratio, compensates for a linear degradation, and achieves a high spectrum efficiency. Thus, coherent detection is expected to be widely spread in a next-generation optical communication system.

A coherent receiver mixes a received optical signal and local oscillator light before converting the received optical signal into an electrical signal. By so doing, a baseband signal indicating an electric field envelope of the optical signal is obtained. Then, transmission data is recovered from the baseband signal through digital signal processing.

However, it is difficult to make completely identical with each other the frequency of a transmitter laser light source to generate carrier light in an optical transmitter and the frequency of a local oscillator light source to generate local oscillator light in an optical receiver. Thus, the optical receiver compensates for a frequency difference (i.e., frequency offset) between the transmitter laser light source and the local oscillator light source so as to recover data. Currently, commercially available lasers have an oscillatory frequency error of ±2.5 GHz. Accordingly, in the aforementioned optical communication system, a frequency offset of ±5 GHz could be generated.

A method for superimposing a dithering signal on generated laser light by frequency modulation is known as one technology to stabilize the oscillation frequency of a laser light source. In this case, a frequency component of the dithering signal or a harmonic content thereof is detected from a generated optical signal, and the oscillation frequency is controlled according to the result of the detection. This allows the oscillation frequency of the laser light source to be locked at a desired value. The frequency of the dithering signal is sufficiently slow in comparison with the symbol rate of a transmission signal.

Methods for detecting frequency offset in a digital coherent receiver are described in, for example, Japanese Laid-open Patent Publication No. 2009-253971 and Japanese Laid-open Patent Publication No. 2011-228819.

An optical receiver that uses coherent detection and digital signal processing (hereinafter referred to as a "digital coherent receiver") estimates a frequency offset and compensates for the frequency offset in accordance with the result of the estimation. Then, the digital coherent receiver obtains a modulated phase indicating code information from the received signal for which frequency offset has been compensated for and recovers transmission data from the modulated phase.

While a transmitter laser light source is being controlled using the aforementioned dithering signal in an optical transmitter, the frequency of a carrier signal varies in accordance with the dithering signal. In this case, frequency offset also varies in accordance with the dithering signal. Thus, when a dithering signal is used in an optical transmitter, a digital coherent receiver preferably performs frequency offset estimation (and frequency offset compensation) at a high speed so that the dithering signal can be followed. When a dithering signal is used in an optical transmitter and frequency offset estimation is performed at a low speed, frequency offset from is not properly compensated for, thereby preventing a phase error of a received optical signal from being properly corrected. In this case, data is recovered according to a signal having a phase error, causing a risk of degradation of a bit error rate.

The phase of an optical signal may also be changed by another factor. For example, factors of a phase error include ASE (Amplified Spontaneous Emission), noise, dispersion, and waveform degradation caused by nonlinear effect in an optical transmission line between an optical transmitter and an optical receiver. However, the phase error caused by these factors may be suppressed by averaging. Thus, performing frequency offset estimation (and frequency offset compensation) at a low speed suppresses a phase error caused by those factors and improves a bit error rate. In other words, performing frequency offset estimation at a high speed does not suppress a phase error caused by, for example, ASE, noise, dispersion, and a nonlinear effect and does not improve a bit error rate.

Note that "Estimating frequency offset at a high speed" is achieved by, for example, estimating frequency offset according to a small number of received symbols. "Estimating frequency offset at a low speed" is achieved by, for example, estimating frequency offset according to many received symbols.

In such a situation, a digital coherent receiver is preferably one able to receive an optical signal from an arbitrary optical transmitter. However, a characteristic improvement by averaging is not obtained in a configuration in which frequency offset estimation is performed at a high speed. Meanwhile, a communication with an optical transmitter that uses a dithering signal may be degraded in a configuration in which frequency offset estimation is performed at a low speed.

SUMMARY

According to an aspect of the embodiments, an optical receiver includes: a frontend circuit configured to generate a baseband signal representing a received optical signal by using local oscillator light; a frequency offset estimator configured to estimate a frequency offset of the baseband signal; a frequency offset corrector configured to correct the frequency offset of the baseband signal according to an estimation result by the frequency offset estimator; a phase recovery configured to recover a modulated phase from the baseband signal for which the frequency offset is corrected; a data recovery configured to recover transmission data according to the modulated phase recovered by the phase recovery; and a controller configured to control an operation of the frequency offset estimator according to a phase error of the baseband signal for which the frequency offset is corrected.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates operations of an integration circuit and an operation parameter control circuit.

FIGS. 7A-7C illustrate residual frequency offset with respect to an averaging time of frequency offset estimation.

FIG. 10 is a flowchart illustrating a frequency offset compensation method in accordance with the first embodiment.

FIG. 13 is a flowchart illustrating a frequency offset compensation method in accordance with the second embodiment.

DESCRIPTION OF EMBODIMENTS

Figure 1:
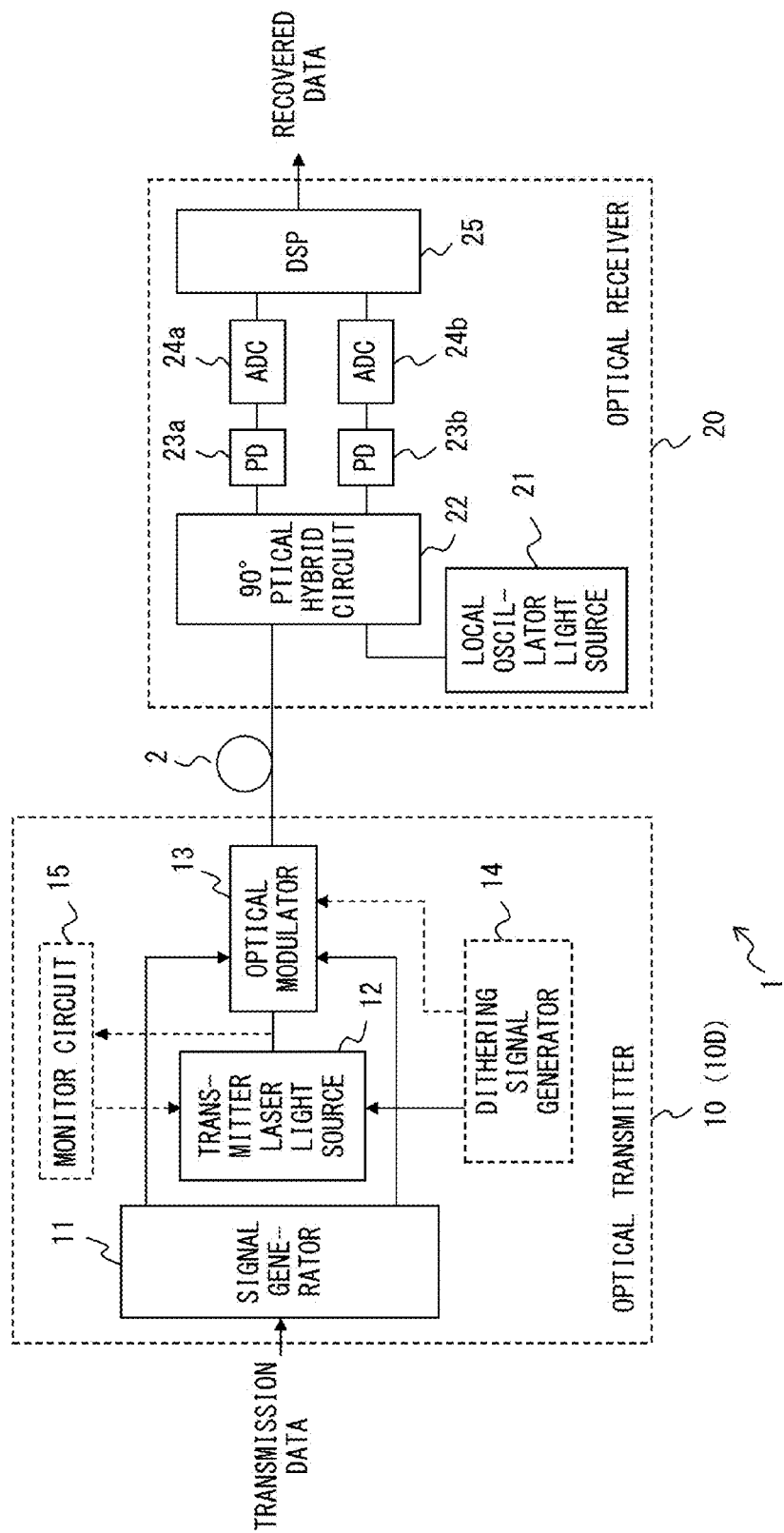
FIG. 1 illustrates an example of an optical communication system in accordance with an embodiment of the invention.

FIG. 1 illustrates an example of an optical communication system in accordance with an embodiment of the invention. As illustrated in FIG. 1, an optical communication system 1 in accordance with the embodiment includes an optical transmitter 10 and an optical receiver 20. An optical signal transmitted from the optical transmitter 10 propagates to the optical receiver 20 via an optical transmission line 2. The optical transmission line 2 may have one or more optical relay nodes provided therein.

The optical transmitter 10 includes a signal generator 11, a transmitter laser light source 12, and an optical modulator 13. The signal generator 11 generates a set of driving signals by mapping transmission data on a constellation in accordance with a specified modulation scheme. The set of driving signals indicate an I component and a Q component. The modulation scheme may be DP-QPSK, DP-BPSK, DP-8QAM, or DP-16QAM.

The transmitter laser light source 12 generates a continuous wave light having a specified optical frequency. The transmitter laser light source 12 is, for example, a frequency-tunable laser light source. The optical modulator 13 generates an optical signal by modulating, with the driving signals provided by the signal generator 11, the continuous wave light generated by the transmitter laser light source 12. The optical signal is propagated via the optical transmission line 2 and received by the optical receiver 20.

The optical transmitter 10 may include a lock function to stabilize a frequency (i.e., laser wavelength) of the transmitter laser light source 12. The lock function is achieved by, for example, a dithering signal generator 14 and a monitor circuit 15 illustrated in FIG. 1. The dithering signal generator 14 generates a dithering signal. The dithering signal is, for example, a sine wave signal. The rate of the dithering signal is sufficiently lower than the symbol rate of data transmitted by the optical signal. For example, if the symbol rate is from several giga symbols per second to dozens of giga symbols per second, then the frequency of the dithering signal is from several Hz to several MHz. The dithering signal is provided to the transmitter laser light source 12. In this case, the transmitter laser light source 12 superimposes the dithering signal on the optical signal by frequency modulation. Thus, the optical signal output from the transmitter laser light source 12 includes a dithering-signal component. Note that the dithering signal may be provided to the optical modulator 13. In this case, the optical transmitter 13 superimposes the dithering signal on the optical signal by frequency modulation.

As described above, the optical transmitter 10 may superimpose a frequency modulated signal on an optical signal by providing a dithering signal having an arbitrary frequency to the transmitter laser light source 12 or the optical transmitter 13. Accordingly, the optical transmitter 10 may use the dithering signal as a signal for a communication with correspondent equipment (the optical receiver 20 in FIG. 1).

The monitor circuit 15 monitors a dithering-frequency component included in the output optical signal and/or a harmonic content of the dithering-frequency component. Assume that, according to the dithering frequency component included in the output optical signal and/or the harmonic content of the dithering frequency component, the monitor circuit 15 may decide whether a frequency of the transmitter laser light source 12 is properly controlled. Note that a method is publicly known for deciding whether the frequency of a laser light source is properly controlled according to a dithering frequency component included in an output optical signal and/or a harmonic content of the dithering frequency component. Thus, the frequency of the transmitter laser light source 12 is stabilized when the transmitter laser light source 12 is controlled according to a dithering frequency component included in an output optical signal and/or a harmonic content of the dithering frequency component. An optical transmitter having a function to stabilize a laser wavelength by using a dithering signal may hereinafter be referred to as an "optical transmitter 10D".

As illustrated in FIG. 1, the optical receiver 20 includes a local oscillator light source 21, a 90-degree optical hybrid circuit 22, photodetectors 23a and 23b, A/D converters 24a and 24b, and a digital signal processing circuit (DSP) 25. Note that the optical receiver 20 may include other elements.

The local oscillator light source 21 generates local oscillator light. Local oscillator light has a frequency that is almost the same as a frequency of the transmitter laser light source 12 (i.e., a frequency of carrier light). However, the frequency of carrier light and the frequency of local oscillator light are not necessarily completely identical with each other. The difference between the frequency of carrier light and the frequency of local oscillator light will hereinafter be referred to as "frequency offset".

The 90-degree optical hybrid circuit 22 generates 90 degree-shifted local oscillator light from the local oscillator light. 90-degree-shifted local oscillator light is obtained by shifting the phase of the local oscillator light by 90 degrees. In addition, the 90-degree optical hybrid circuit 22 generates an I-component optical signal by combining the local oscillator light and a received optical signal and generates a Q-component optical signal by combining the 90-degree-shifted local oscillator light and the received optical signal. The photodetectors 23a and 23b respectively convert the I-component optical signal and the Q-component optical signal into an I-component electrical signal and a Q-component electrical signal. The A/D converters 24a and 24b respectively convert the I-component electrical signal and the Q-component electrical signal into an I-component digital signal and a Q-component digital signal.

The I-component digital signal and the Q-component digital signal are baseband signals that indicate a received optical signal. That is, the baseband signals represent the complex electric field information of the received optical signal.

The DSP 25 recovers transmission data according to the I-component digital signal and the Q-component digital signal. The DSP 25 recovers the transmission data from the received optical signal while compensating for frequency offset.

In the optical communication system illustrated in FIG. 1, the optical receiver 20 may possibly receive an optical signal transmitted from the optical transmitter 10 and may possibly receive an optical signal transmitted from the optical transmitter 10D. That is, the optical receiver 20 may possibly receive an optical signal on which a dithering signal is not superimposed and may possibly receive an optical signal on which a dithering signal is superimposed. Note that, when a received optical signal includes a dithering frequency component, frequency offset varies in the cycle of a dithering signal.

Thus, when a received optical signal includes a dithering frequency component, the optical receiver 20 preferably performs frequency offset estimation at a high speed to compensate for the frequency offset that varies in the cycle of a dithering signal. Meanwhile, when a received optical signal does not include a dithering frequency component, frequency offset slowly changes with, for example, an environment surrounding the optical transmitter 10, the optical transmission line 2, or the optical receiver 20. In this case, the optical receiver 20 preferably performs frequency offset estimation at a low speed in a manner such that a phase error caused by, for example, ASE, noise, dispersion, or a nonlinear effect is suppressed by averaging.

<First Embodiment>

Figure 2:
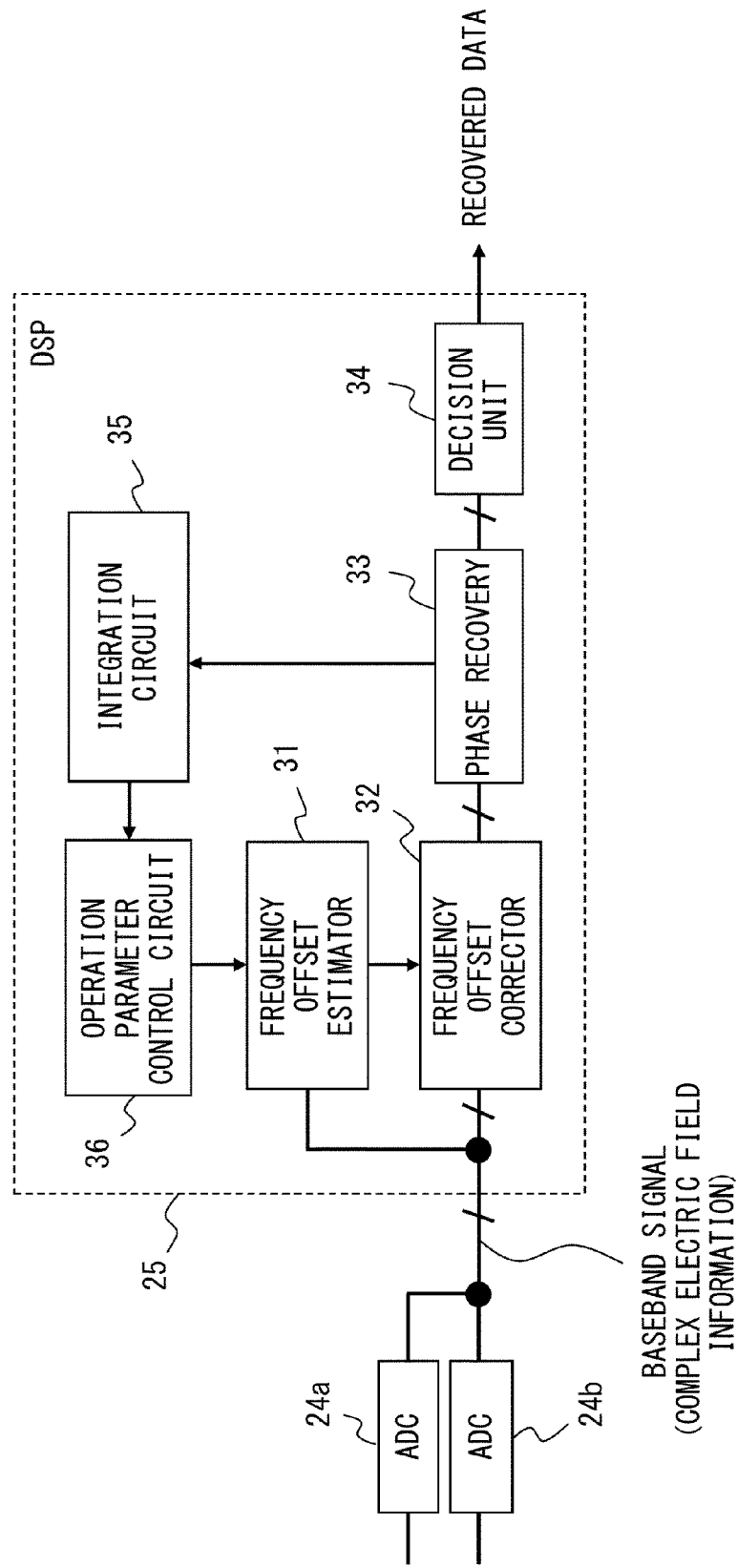
FIG. 2 illustrates the configuration of an optical receiver in accordance with a first embodiment.

FIG. 2 illustrates the configuration of an optical receiver 20 in accordance with a first embodiment. Note that the local oscillator light source 21, the 90-degree optical hybrid circuit 22, and the photodetectors 23a and 23b are omitted in FIG. 2.

The DSP 25 includes a frequency offset estimator 31, a frequency offset corrector 32, a phase recovery 33, a decision unit 34, an integration circuit 35, and an operation parameter control circuit 36. However, the DSP 25 may include other functions. For example, the DSP 25 may include an equalizer that equalizes waveform distortion.

The DSP 25 receives a baseband signal (in this example, the complex electric field information) indicating a received optical signal. The complex electric field information is generated by the local oscillator light source 21, the 90-degree optical hybrid circuit 22, the photodetectors 23a and 23b, and the A/D converters 24a and 24b, illustrated in FIG. 1. That is, the complex electric field information is expressed by an I-component digital signal and a Q-component digital signal. The complex electric field information is provided to the frequency offset estimator 31 and the frequency offset corrector 32.

The frequency offset estimator 31 estimates the frequency offset between carrier light and local oscillator light. The frequency offset estimate obtained by the frequency offset estimator 31 is provided to the frequency offset corrector 32.

Figure 3:
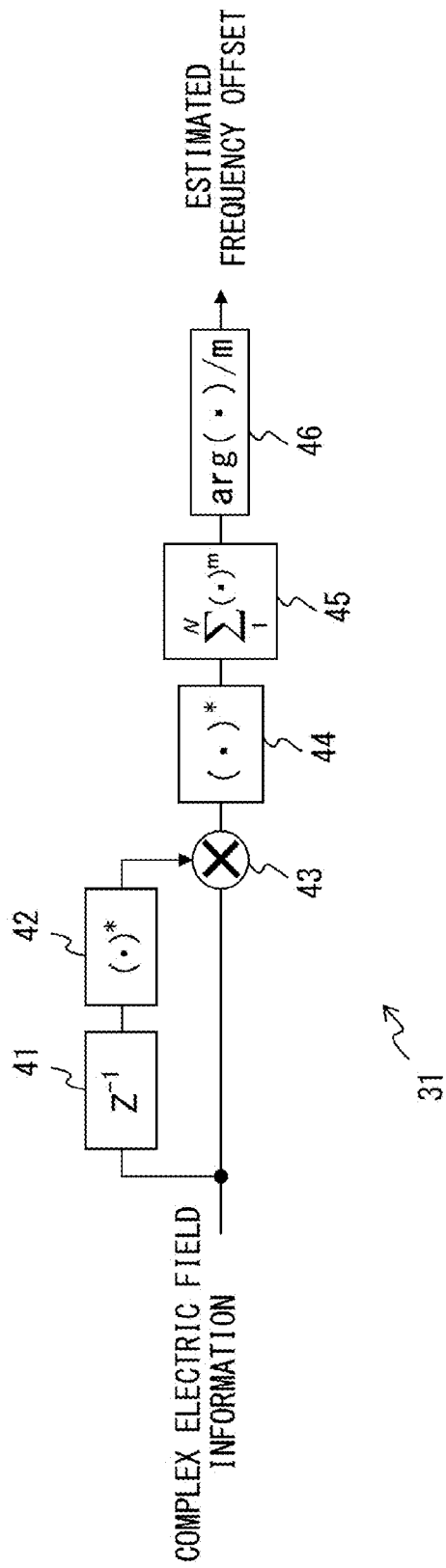
FIG. 3 illustrates an example of a frequency offset estimator.

FIG. 3 illustrates an example of the frequency offset estimator 31. In this example, the modulation scheme is m-PSK.

For example, when the modulation scheme is QPSK, the frequency offset estimator 31 is operated at m=4.

A delay element 41 delays received complex electric field information by one symbol time so as to generate delayed complex electric field information. A complex computing unit 42 generates a complex conjugate of the delayed complex electric field information obtained by the delay element 41. A multiplier 43 multiplies the complex conjugate of the delayed complex electric field information by the received complex electric field information. An m-th power calculator 44 calculates the m-th power of an output signal of the multiplier 43. For N symbols, an adder 45 sums up output signals of the m-th power calculator 44. "N" is specified or controlled by an operation parameter control signal, which will be described hereinafter. A phase calculator 46 calculates an argument of an output signal of the adder 45 and generates an estimated frequency offset by dividing the argument by m.

Figure 4:
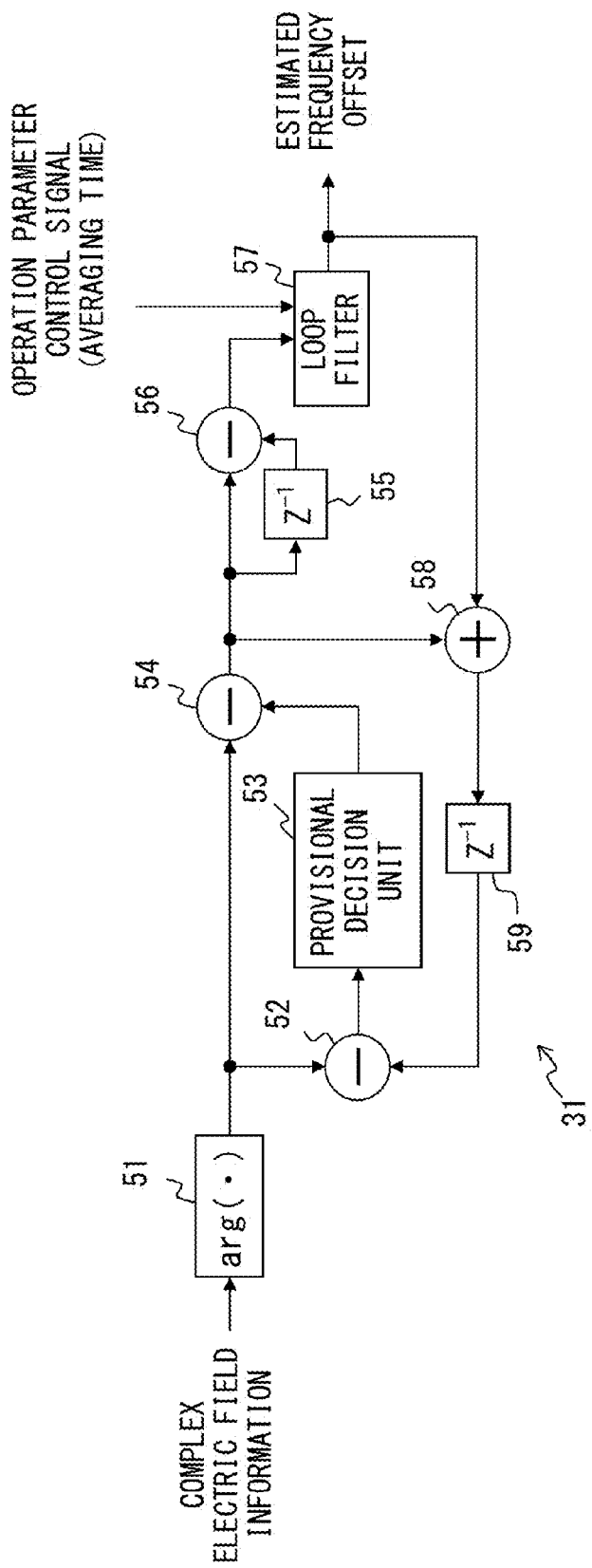
FIG. 4 illustrates another example of a frequency offset estimator.

FIG. 4 illustrates another example of the frequency offset estimator 31. In the example illustrated in FIG. 4, the frequency offset estimator 31 includes an argument calculator 51, a subtractor 52, a provisional decision unit 53, a subtractor 54, a delay element 55, a subtractor 56, a loop filter 57, an adder 58, and a delay element 59.

The argument calculator 51 calculates an argument of complex electric field information. The subtractor 52 subtracts an output signal of the delay element 59 from the argument obtained by the argument calculator 51. The provisional decision unit 53 decides (or identifies) a signal according to a subtraction result obtained by the subtractor 52. The subtractor 54 subtracts an output signal of the provisional decision unit 53 from the argument obtained by the argument calculator 51. The delay element 55 delays an output signal of the subtractor 54 by one symbol time. The subtractor 56 calculates a difference between the output signal of the delay element 55 and the output signal of the subtractor 54.

The loop filter 57 averages output signals of the subtractor 56. The loop filter 57 is achieved by, for example, an IIR (Infinite Impulse Response) filter. An averaging time of the loop filter 57 is specified and controlled by an operation parameter control signal, which will be described hereinafter. The adder 58 adds an output signal of the loop filter 57 to an output signal of the subtractor 54. The delay element 59 delays an output signal of the adder 58 by one symbol time.

Assume that, at time t+1, the argument calculator 51 obtains argument $\theta(t+1)$. Argument $\theta(t+1)$ is expressed as $\theta d(t+1)+\theta fo(t+1)+\theta pn(t+1)$. $\theta d$ indicates a modulated phase. $\theta fo$ indicates the amount of a phase rotation caused by frequency offset. $\theta pn$ indicates phase noise.

An output signal of the provisional decision unit 53 indicates the result of a provisional decision with respect to a modulated phase. That is, an output signal of the provisional decision unit 53 may be approximately expressed as $\theta d(t+1)$. Thus, an output signal of the subtractor 54 is approximately expressed as θfo(t+1)+θpn(t+1). In this case, an output signal of the delay element 55 is expressed as θfo(t)+θpn(t).

The subtractor 56 calculates the difference between an output signal of the delay element 55 and an output signal of the subtractor 54. That is, an output signal of the subtractor 56 is expressed as {θfo(t+1)−θfo(t)}+{θpn(t+1)−θpn(t)}. Assume that phase noise θpn slowly changes with respect to time. In this case, θpn(t+1)−θpn(t)=0 is satisfied. Accordingly, an output signal of the subtractor 56 is expressed as θfo(t+1)−θfo(t). Hereinafter, "θfo(t+1)−θfo(t)" will be referred to as Δfo.

Δfo indicates the amount of a phase change caused by frequency offset in a specified period (in this example, one symbol time). Thus, the estimated frequency offset is obtained by averaging output signals of the subtractor 56 using the loop filter 57.

An output signal of the adder 58 is expressed as θfo(t+1)+θpn(t+1)+Δfo. Thus, an output signal of the delay element 59 is expressed as θfo(t)+θpn(t)+Δfo. In accordance with the definition above, θfo(t+1)−θfo(t)=Δfo. The expression θpn(t+1)=θpn(t) is also satisfied. Hence, an output signal of the delay element 59 may be expressed as θfo(t+1)+θpn(t+1). Accordingly, an output signal of the subtractor 52 indicates modulation component θd(t+1). That is, an output signal of the provisional decision unit 53 indicates the result of a provisional decision for a modulated phase.

As described above, the frequency offset estimator obtains an estimated frequency offset by removing a modulation component and a noise component from received complex electric field information. The optical receiver 20 uses the estimated frequency offset to correct frequency offset. The frequency offset is corrected using a feedforward scheme or a feedback scheme. In the first embodiment, frequency offset is corrected using the feedforward scheme. The "correction" includes a process of compensating for frequency offset and a process of reducing frequency offset.

The frequency offset corrector 32 corrects the frequency offset of complex electric field information according to the estimated frequency offset obtained by the frequency offset estimator 31. That is, the frequency offset corrector 32 corrects the frequency offset of a received optical signal. For example, the frequency offset corrector 32 compensates for frequency offset by applying to complex electric field information a property that is opposite to the estimated frequency offset. In this case, the constellation of a received symbol is rotated by an angle corresponding to the frequency offset so as to cancel the frequency offset.

Figure 5:
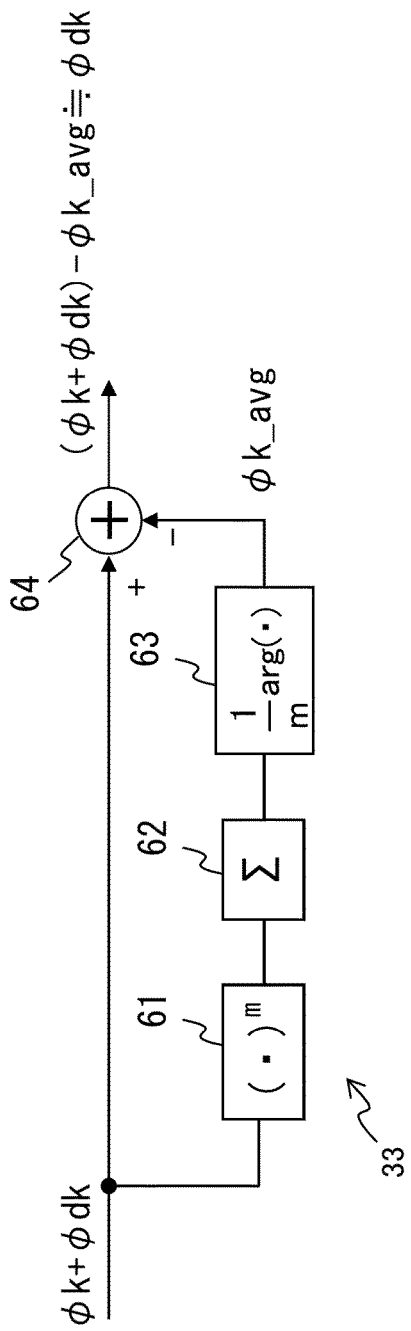
FIG. 5 illustrates an example of a phase recovery.

As illustrated in FIG. 5, the phase recovery 33 includes, for example, an m-th power calculator 61, a summation unit 62, a phase calculator 63, and a subtractor 64. In this example, the modulation scheme is m-PSK. A signal for which frequency offset has been corrected by the frequency offset corrector 32 is input to the phase recovery 33. An input signal of the phase recovery 33 is expressed as φdk+φ. φdk indicates a modulated phase. φk indicates the difference between the phase of carrier light and the phase of local oscillator light (i.e., phase error).

The m-th power calculator 61 calculates the m-th power of the input signal (φdk+φk). For a plurality of symbols, the summation unit 62 sums up output signals of the m-th power calculator 61. The phase calculator 63 calculates an argument of an output signal of the adder 62 and further calculates φk_avg by dividing the argument by m. φk_avg indicates the estimate of a difference between the phase of carrier light and the phase of local oscillator light (i.e., the estimated phase error). Thus, modulated phase φk is obtained in the subtractor 64 by subtracting φk_avg from input signal φdk+φk.

As described above, φk_avg indicates the estimated phase error. The phase recovery 33 estimates modulated phase φk by subtracting φk_avg from input signal φdk+φk. That is, φk_avg is used to compensate for a phase error. Thus, φk_avg indicates the amount of phase compensation.

The decision unit 34 decides data for each symbol according to modulated phase φk obtained by the phase recovery 33. For example, when the modulation scheme is QPSK, two bits of data are decided for each symbol. Consequently, the data transmitted from the optical transmitter 10 is recovered.

The integration circuit 35 obtains a phase error detected by the phase recovery 33 (i.e., the estimated phase error or the amount of phase compensation). The integration circuit 35 integrates the phase error so as to generate a first integration value. The integration circuit 35 also integrates the absolute value of the phase error detected by the phase recovery 33 so as to generate a second integration value.

The operation parameter control circuit 36 generates an operation parameter control signal according to the first and second integration values generated by the integration circuit 35. The operation parameter control signal is provided to the frequency offset estimator 31. That is, an operation of the frequency offset estimator 31 is controlled by the operation parameter control signal.

FIG. 6 illustrates operations of the integration circuit 35 and the operation parameter control circuit 36. The integration circuit 35 includes an offset adjusting circuit 70, an integrator 71, an absolute value calculator 72, and an integrator 73. The offset adjusting circuit 70 removes an offset component of the phase error. In this example, an offset component of the phase error corresponds to the difference between the phase of the transmitter laser light source 12 (i.e., the phase of carrier light on which a dithering signal is not superimposed) and the phase of local oscillator light. In this case, the offset adjusting circuit 70 calculates the average of the phase errors calculated by the phase recovery 33. The offset adjusting circuit 70 outputs the difference between the phase error and the average of the phase errors (i.e., the deviation with respect to the average). Note that the descriptions of the operation of the integration circuit 35 are based on the assumption that a "phase error" includes a phase error from which an offset component has been removed.

The integrator 71 integrates the phase error so as to generate a first integration value. The absolute value calculator 72 calculates the absolute value of the phase error. The integrator 73 integrates the absolute value of the phase error obtained by the absolute value calculator 72 so as to generate a second integration value.

The operation parameter control circuit 36 includes a subtractor 74 and a comparator circuit 75. The subtractor 74 calculates the difference between the first and second integration values. In this example, the subtractor 74 subtracts the first integration value from the second integration value. The result of the subtraction will hereinafter be referred to as a difference D. The comparator circuit 75 compares the difference D with a specified reference level. The comparator circuit 75 generates an operation parameter control signal according to the comparison result. For example, when the difference D is greater than the reference level, the comparator circuit 75 generates an operation parameter control signal that is an instruction to shorten the estimation time of the frequency offset estimator 31 by ΔT. Meanwhile, when the difference D is less than the reference level, the comparator circuit 75 generates an operation parameter control signal that is an instruction to extend the estimation time by ΔT. ΔT is, for example, one symbol time.

For the example illustrated in FIG. 3, the "estimation time of the frequency offset estimator 31" corresponds to the number of symbols added by the adder 45; for the example illustrated in FIG. 4, the estimation time corresponds to the averaging time of the loop filter 57. Thus, the estimation time corresponds to an averaging time required to average the signals each calculated for a symbol at the frequency offset estimator 31.

When the difference between the difference D and the reference level is sufficiently small, the comparator circuit 75 generates an operation parameter control signal that is an instruction to not change the estimation time. Alternatively, when the difference between the difference D and the reference level is sufficiently small, the comparator circuit 75 does not necessarily output an operation parameter control signal. When a trigger signal is provided, the comparator circuit 75 may compare the difference D with the reference level so as to generate an operation parameter control signal. In this case, the trigger signal is provided to the comparator circuit 75 at intervals of, for example, a few seconds.

The operation parameter control signal generated by the integration circuit 35 and the operation parameter control circuit 36 is provided to the frequency offset estimator 31. The frequency offset estimator 31 estimates frequency offset with an estimation time specified by the operation parameter control signal. In the example depicted in FIG. 3, in accordance with an operation parameter control signal, the frequency offset estimator 31 decides the number of symbols to be obtained by the adder 45 (N, in the case of FIG. 3). In the example depicted in FIG. 4, in accordance with an operation parameter control signal, the frequency offset estimator 31 decides an averaging time of the loop filter 57. The averaging time of the loop filter 57 may be indicated by the number of symbols.

The following will describe an operation to correct a frequency offset while controlling an estimation time (or an averaging time) for frequency offset estimation.

As illustrated in FIG. 1, the optical receiver 20 receives an optical signal generated by the optical transmitter 10. Assume that the optical transmitter 10 does not have a function to lock the frequency of the transmitter laser light source 12. That is, in the optical transmitter 10, a dithering signal is not superimposed on an optical signal. In this case, frequency offset is almost constant. Alternatively, the frequency offset may slowly change with respect to time due to, for example, temperature change. Hence, in this case, even when the estimation time for frequency offset estimation is long, the frequency offset estimator 31 may cause the estimated frequency offset to precisely follow the actual frequency offset. Consequently, the frequency offset corrector 32 sufficiently compensates for the frequency offset, making a residual frequency offset small. When the residual frequency offset is small, a modulated phase is precisely estimated, thereby making the error rate of the data recovered by the decision unit 34 low. The residual frequency offset means a frequency offset component included in an output signal of the frequency offset corrector 32.

As described above, a long estimation time for frequency offset estimation suppresses a phase error caused by, for example, ASE, noise, dispersion, or a nonlinear effect by averaging, thereby improving a bit error rate. Thus, as long as the residual frequency offset can be made to be small, the estimation time for frequency offset estimation may preferably be long.

However, when the optical transmitter 10 includes a function to lock a laser light source using a dithering signal, the dithering signal is superimposed on an optical signal with frequency modulation. In this case, frequency offset varies in accordance with the dithering signal. Thus, depending on the relationship between the frequency of the dithering signal and the estimation time for frequency offset estimation, the frequency offset estimator 31 may not be able to cause an estimated frequency offset to follow the actual frequency offset.

FIGS. 7A-7C illustrate a relationship between an estimation time for frequency offset estimation (hereinafter referred to as an "estimation time ET") and residual frequency offset. In the examples depicted in FIGS. 7A-7C, the difference between the frequency of the transmitter laser light source 12 and the frequency of the local oscillator light source 21 (i.e., the frequency offset in the absence a dithering signal) is 1 GHz. The frequency of the dithering signal is 100 MHz. The symbol rate of an optical signal is about 20 Gbaud.

FIG. 7A depicts the residual frequency offset achieved when the estimation time ET is sufficiently short relative to the cycle of the dithering signal. In FIG. 7A, the estimation time ET is about twenty symbol times. That is, the estimation time ET is about one tenth the cycle of the dithering signal. In this case, the frequency offset estimator 31 may cause an estimated frequency offset to precisely follow the actual frequency offset. Consequently, the frequency offset corrector 32 sufficiently compensates for the frequency offset, thereby causing the residual frequency offset to be almost 0.

In FIG. 7B, the estimation time ET is about forty symbol times. That is, the estimation time ET is about one fifth the cycle of the dithering signal. In this case, the frequency offset estimator 31 cannot cause an estimated frequency offset to sufficiently follow the actual frequency offset. Consequently, the frequency offset corrector 32 does not sufficiently compensate for frequency offset, and hence residual frequency offset is generated.

In FIG. 7C, the estimation time ET is about 100 symbol times. That is, the estimation time ET is about half the cycle of the dithering signal. In this case, the frequency offset estimator 31 provides a low-precision estimated frequency offset. Consequently, the frequency offset corrector 32 does not compensate for frequency offset, and hence a large residual frequency offset is generated.

As described above, the estimation time ET that is excessively long relative to the frequency of a dithering signal leads to the generation of residual frequency offset. The residual frequency offset is caused by the dithering signal. Thus, the residual frequency offset varies with substantially the same frequency as the frequency of the dithering signal. The residual frequency offset affects an operation of the phase recovery 33.

As described above, the phase recovery 33 removes from the phase of an input signal a difference phase that represents a difference between the phase of carrier light and the phase of local oscillator light. The difference phase corresponds to a phase error (i.e., the amount of phase compensation).

Figure 8A:
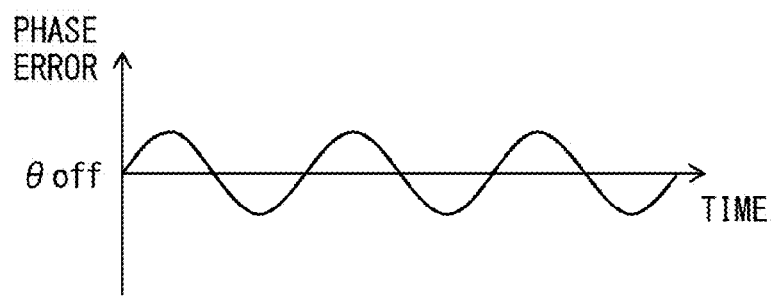
FIGS. 8A-8D illustrate an operation of an integration circuit.

When the residual frequency offset is 0, the phase error is almost constant. However, when residual frequency offset is present, a phase error caused by the residual frequency occurs. That is, the phase error varies in accordance with the residual frequency offset. Thus, in this case, the phase error varies in a cycle that is the same as a cycle of the dithering signal, as illustrated in FIG. 8A. "θoff" in FIG. 8A indicates an offset component of a phase error and corresponds to the phase error at the time of the residual frequency offset that is 0.

Figure 8B:
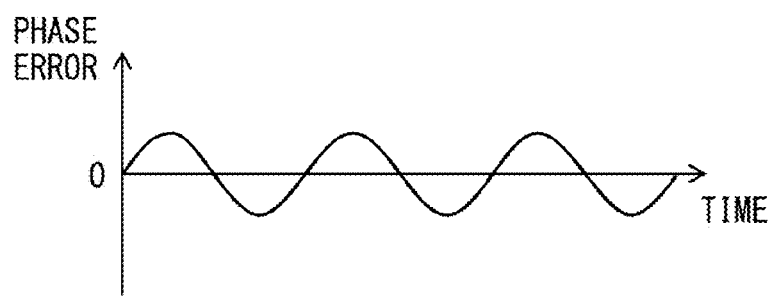

The integration circuit 35 integrates a phase error. In this case, the offset component θoff of the phase error is not necessarily 0. When the offset component θoff is not 0, the integration circuit 35 removes the offset component θoff of the phase error, as illustrated in FIG. 8B. The offset component θoff is removed by the offset adjusting circuit 70 illustrated in FIG. 6.

Figure 8C:
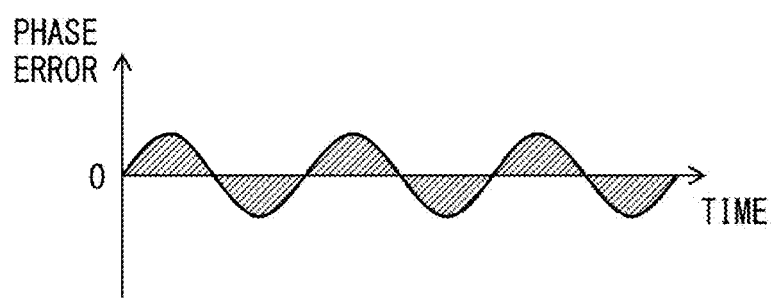
Figure 8D:
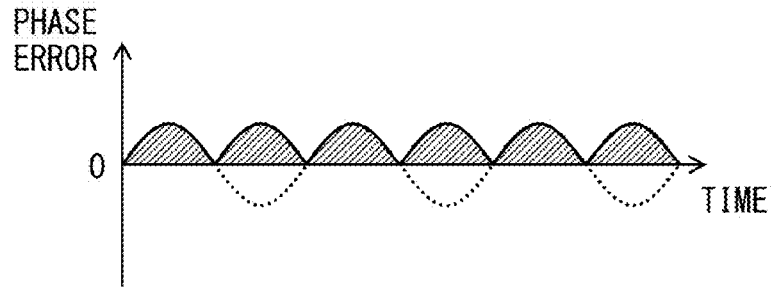

As illustrated in FIG. 8C, the integrator 71 integrates the phase error so as to generate a first integration value. In this case, the average phase error is 0. Thus, the first integration value is almost 0. By contrast, as illustrated in FIG. 8D, the integrator 73 integrates the absolute value of the phase error so as to generate a second integration value. Accordingly, the second integration value is a positive value.

In the operation parameter control circuit 36, the subtractor 74 obtains the difference D by subtracting the first integration value from the second integration value.

The difference D is a positive value when the residual frequency offset caused by a dithering signal is generated. The absolute value of the difference D depends on the amount of the residual frequency offset. For example, in the example depicted in FIG. 7A, the difference D is almost 0. Meanwhile, in the example depicted in FIG. 7C, a large difference D is obtained.

When the difference D is greater than the reference level, the operation parameter control circuit 36 decides that a phase error detected at the phase recovery 33 has periodical change with respect to time. In this case, the operation parameter control circuit 36 generates an operation parameter control signal that is an instruction to shorten the estimation time ET by ΔT. Accordingly, the frequency offset estimator 31 shortens the estimation time ET by ΔT. This control is repeatedly performed, and the residual frequency offset becomes small as illustrated in FIG. 7A when the estimation time ET becomes sufficiently short relative to the frequency of the dithering signal. A small residual frequency offset leads to the improvement of the error rate of the data recovered by the decision unit 34.

Figure 9A:
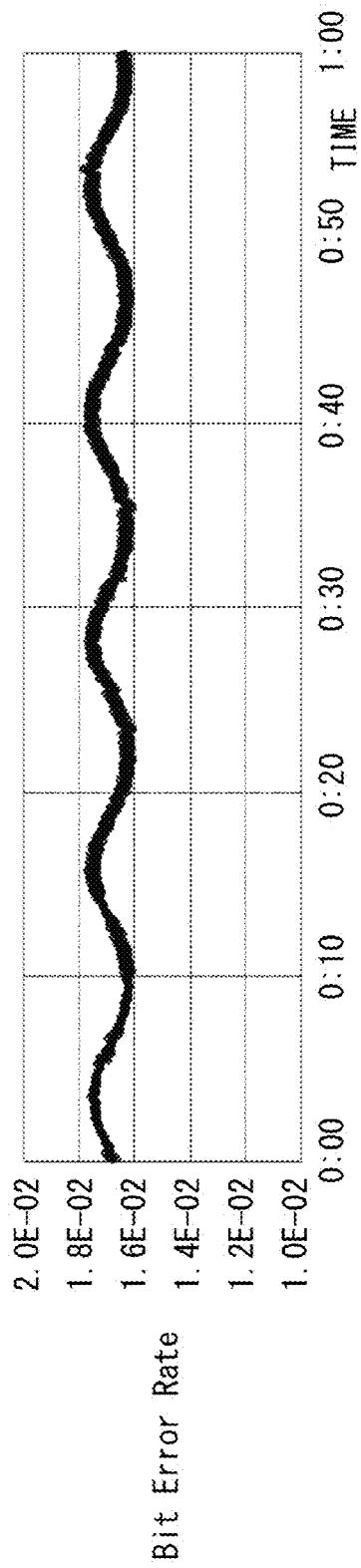
FIGS. 9A and 9B illustrate a bit error rate with respective to an averaging time of frequency offset estimation.
Figure 9B:
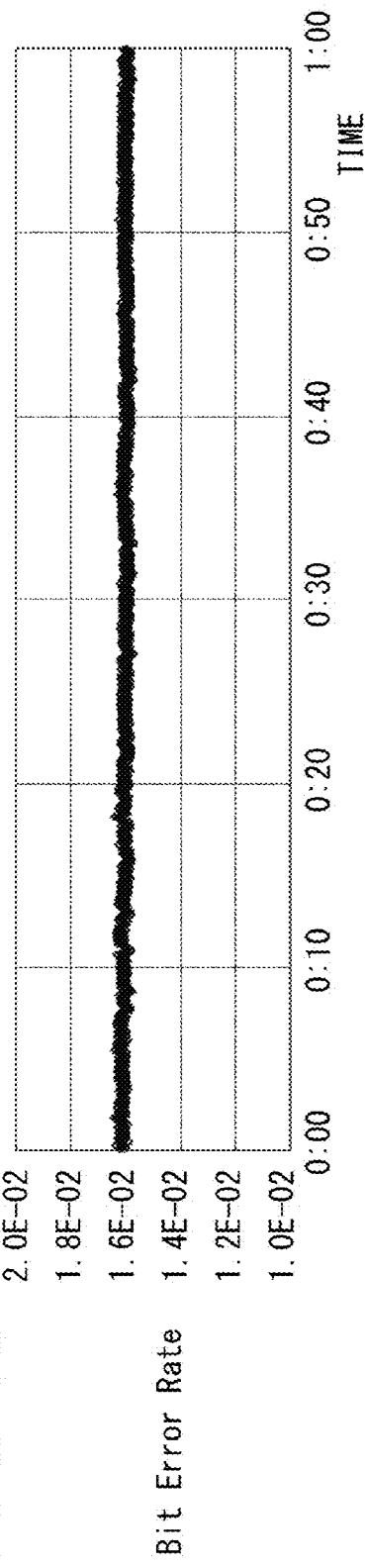

FIGS. 9A and 9B illustrate a bit error rate with respect to the estimation time ET for frequency offset estimation. Note that a dithering signal is superimposed on an optical signal.

The bit error rate is periodically degraded as illustrated in FIG. 9A when the estimation time ET is excessively long with respect to the cycle of the dithering signal. By contrast, appropriately shortening the estimation time ET with respect to the cycle of the dithering signal improves the bit error rate, as illustrated in FIG. 9B.

When a dithering signal is not superimposed on an optical signal, frequency offset is precisely compensated for, thereby making residual frequency offset small. In this case, the phase error detected at the phase recovery 33 is almost constant. Hence, the difference between the first integration value obtained by the integrator 71 and the second integration value obtained by the integrator 73 (i.e., the difference D) is almost 0. Accordingly, the difference D becomes less than the reference level, and the operation parameter control circuit 36 generates an operation parameter control signal that instructs to extend the estimation time ET by ΔT.

Upon receipt of the operation parameter control signal, the frequency offset estimator 31 extends the estimation time ET by ΔT. Repeatedly performing this control makes the estimation time ET sufficiently long with respect to the cycle of the dithering signal. This suppresses a phase error caused by, for example, ASE, noise, dispersion, or a nonlinear effect by averaging.

FIG. 10 is a flowchart illustrating a frequency offset compensation method in accordance with the first embodiment. The processes of the flowchart are repeatedly performed by the DSP 25. The DSP 25 receives a baseband signal (complex electric field information) indicating a received optical signal from a frontend circuit (e.g., the local oscillator light source 21, the 90-degree optical hybrid circuit 22, the photodetectors 23a and 23b, and the A/D converter 24a and 24b).

In S1, the frequency offset estimator 31 updates the averaging time of frequency offset estimation (i.e., the estimation time of the frequency offset estimator 31) in accordance with the operation parameter control signal provided from the operation parameter control circuit 36. Note that, when the process of the flowchart starts, in S1, the initial value of the averaging time of frequency offset estimation is provided to the frequency offset estimator 31.

In S2, the frequency offset estimator 31 estimates frequency offset with the updated averaging time. Then, the frequency offset corrector 32 corrects the frequency offset of the received signal according to the frequency offset estimated by the frequency offset estimator 31. Note that "correct" is not limited to the process of completely compensating for the frequency offset of a received signal, but the term also includes the process of decreasing the frequency offset of a received signal.

In S3, the phase recovery 33 recovers a modulated phase by compensating for the phase error of the received signal for which the frequency offset has been corrected. The decision unit 34 recovers transmission data according to the modulated phase recovered by the phase recovery 33.

In S4, the integration circuit 35 obtains the phase error detected by the phase recovery 33. The offset adjusting circuit 70 removes an offset component of the phase error. The offset component of the phase error corresponds to the difference between the phase of carrier light and the phase of local oscillator light (θoff in the case of FIG. 8A). At this time, the offset adjusting circuit 70 calculates, for example, an average phase error. As illustrated in FIG. 8B, the offset adjusting circuit 70 calculates the deviation of the phase error with respect to the average value. This provides the phase error from which the offset component has been removed.

In S5, the integrator 71 generates a first integration value by integrating the phase error. In S6, the absolute value calculator 72 calculates the absolute value of the phase error. In S7, the integrator 73 generates a second integration value by integrating the absolute value of the phase error obtained by the absolute value calculator 72.

In S8, the operation parameter control circuit 36 calculates the difference between the first and second integration values. In the aforementioned example, the difference is generated by subtracting the first integration value from the second integration value. In S9, the operation parameter control circuit 36 compares the difference D obtained in S8 with a specified reference level.

When the difference obtained in S8 is greater than the reference level, the operation parameter control circuit 36 generates in S10 an operation parameter control signal to shorten the averaging time of frequency offset estimation by ΔT. Meanwhile, when the difference obtained in S8 is not greater than the reference level, the operation parameter control circuit 36 generates in S11 an operation parameter control signal to extend the averaging time of frequency offset estimation by ΔT. ΔT is, for example, one symbol time. The operation parameter control signal is provided to the frequency offset estimator 31. Then, the process of the DSP 25 returns to S1.

In this manner, the DSP 25 repeatedly performs the processes of the flowchart illustrated in FIG. 10. Accordingly, the averaging time of frequency offset estimation is properly adjusted in accordance with the phase error of a received optical signal. For example, when a dithering signal is superimposed on the optical signal, a phase error may periodically vary with respect to time due to residual frequency offset. Upon detection of periodic variation in the phase error, the optical receiver 20 shortens the averaging time of frequency offset estimation. Consequently, the frequency offset is precisely corrected, thereby improving the data error rate. Meanwhile, when periodic variation in the phase error is not detected, the optical receiver 20 extends the averaging time of frequency offset estimation. In this case, the phase error caused by, for example, ASE, noise, dispersion, or a nonlinear effect is suppressed by averaging.

<Second Embodiment>

In the first embodiment, frequency offset is compensated for using a feedforward scheme. Meanwhile, in the second embodiment, frequency offset is compensated for using a feedback scheme.

Figure 11:
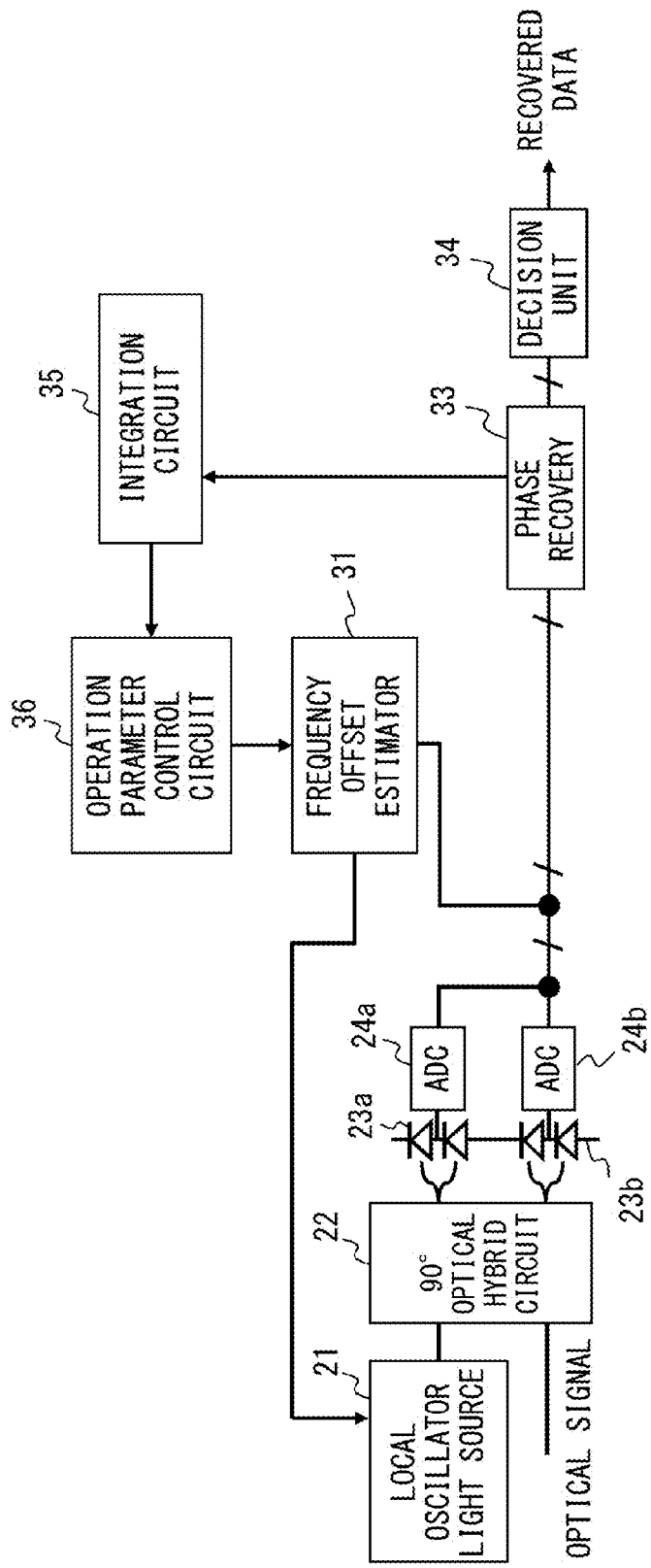
FIG. 11 illustrates the configuration of an optical receiver in accordance with a second embodiment.

FIG. 11 illustrates the configuration of an optical receiver in accordance with the second embodiment. In the second embodiment, a local oscillator light source 21 controls an oscillation frequency in accordance with an instruction from a frequency offset estimator 31. That is, the frequency of local oscillator light is controlled in accordance with an instruction from the frequency offset estimator 31. In the second embodiment, an optical receiver 20 does not necessarily need to include a frequency offset corrector 32.

The operation parameter control circuit 36 generates an operation parameter control signal that designates a cycle in which the frequency of the local oscillator light source 21 is controlled. A method for generating the operation parameter control signal will be described hereinafter.

As in the case of the first embodiment, the frequency offset estimator 31 estimates a frequency offset. However, in the second embodiment, the averaging time in frequency offset estimation may be fixed. The frequency offset estimator 31 controls the local oscillator light source 21 in accordance with an operation parameter control signal generated by the operation parameter control circuit 36.

Figure 12:
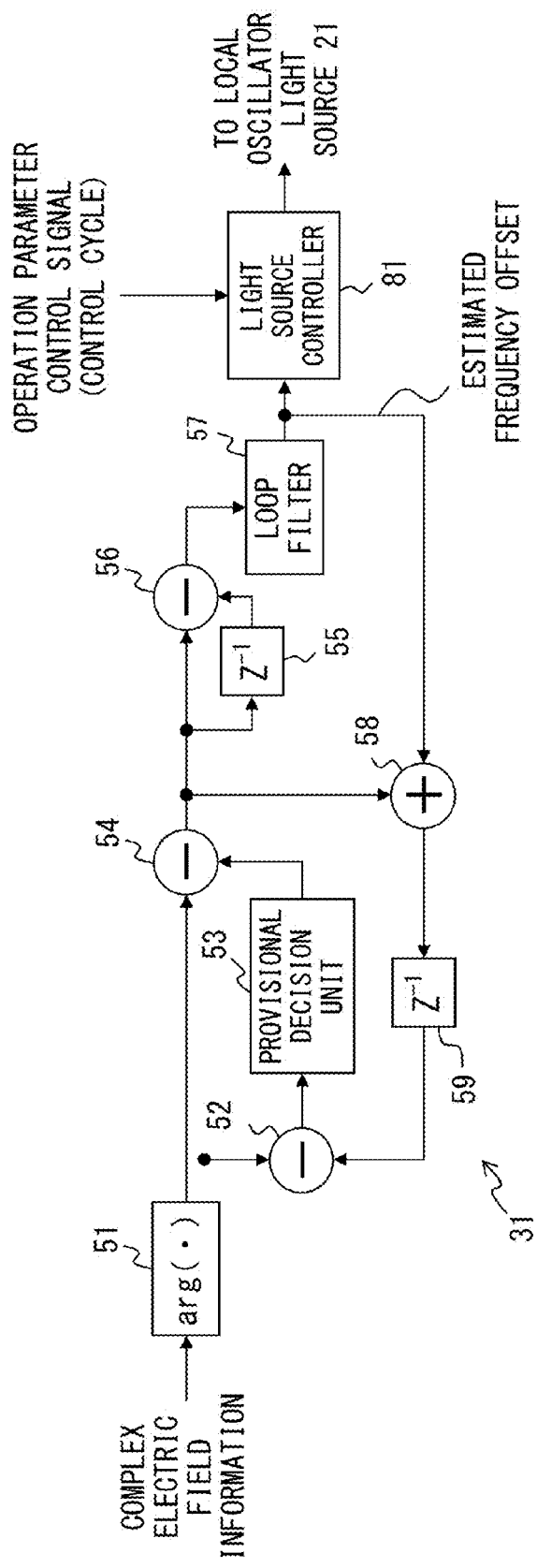
FIG. 12 illustrates an example of a frequency offset estimator in accordance with the second embodiment.

FIG. 12 illustrates an example of the frequency offset estimator 31 in accordance with the second embodiment. The frequency offset estimator 31 in accordance with the second embodiment includes a light source controller 81 in addition to the argument calculator 51, the subtractor 52, the provisional decision unit 53, the subtractor 54, the delay element 55, the subtractor 56, the loop filter 57, the adder 58, and the delay element 59.

The light source controller 81 controls the local oscillator light source 21 in accordance with an operation parameter control signal generated by the operation parameter control circuit 36. In the second embodiment, the operation parameter control signal specifies a cycle in which the frequency of the local oscillator light source 21 is controlled. Thus, the light source controller 81 updates the frequency of the local oscillator light source 21 in the cycle specified by the operation parameter control circuit 36.

The frequency of the local oscillator light source 21 is controlled according to an estimated frequency offset. That is, the frequency of the local oscillator light source 21 is controlled to compensate for or decrease frequency offset.

Meanwhile, the light source controller 81 updates the frequency of the local oscillator light source 21 in the cycle specified by the operation parameter control circuit 36.

In the example depicted in FIG. 12, the frequency offset estimator 31 in accordance with the second embodiment is implemented by adding the light source controller 81 to the configuration illustrated in FIG. 4, but the invention is not limited to this configuration. For example, one possible way to implement the frequency offset estimator 31 in accordance with the second embodiment is the addition of the light source controller 81 to the configuration depicted in FIG. 3.

FIG. 13 is a flowchart illustrating a frequency offset compensation method in accordance with the second embodiment. The processes of the flowchart are repeatedly performed by the DSP 25. The DSP 25 receives a baseband signal (complex electric field information) indicating a received optical signal from a frontend circuit (e.g., the local oscillator light source 21, the 90-degree optical hybrid circuit 22, the photodetectors 23a and 23b, and the A/D converter 24a and 24b). Assume that the frequency offset estimator 31 estimates frequency offset all the time.

In S21, in accordance with the operation parameter control signal provided from the operation parameter control circuit 36, the light source controller 81 updates a control cycle in which a frequency of the local oscillation light is controlled. Note that, when the process of the flowchart starts, in S21, the initial value of the control cycle is provided to the light source controller 81.

In S22, the light source controller 81 controls the frequency of the local oscillator light source 21 according to a frequency offset estimated by the frequency offset estimator 31. In this case, the light source controller 81 controls the frequency of the local oscillator light source 21 in the control cycle updated in S21. That is, for each control cycle, the frequency of the local oscillator light source 21 is controlled according to the estimated frequency offset. The light source controller 81 controls the frequency of the local oscillator light source 21 so as to compensate for frequency offset. Note that, during the period of each control cycle, the frequency of the local oscillator light source 21 remains substantially constant.

Processes of S23-S29 are substantially the same as those of S3-S9 depicted in FIG. 10. That is, the DSP 25 calculates a difference between first and second integration values.

When the difference obtained in S28 is greater than a specified reference level, the operation parameter control circuit 36 generates in S30 an operation parameter control signal to shorten by ΔT the control cycle in which the a frequency of the local oscillation light is controlled. Meanwhile, when the difference obtained in S28 is not greater than the reference level, the operation parameter control circuit 36 generates in S31 an operation parameter control signal to extend by ΔT the control cycle in which a frequency of the local oscillation light is controlled. The ΔT in the second embodiment may be the same as or may be different from the ΔT in the first embodiment. The operation parameter control signal is provided to the light source controller 81. Then, the process of the DSP 25 returns to S21.

In this manner, in the second embodiment, the control frequency in which a frequency of the local oscillation light is controlled is properly adjusted in accordance with the phase error of a received optical signal. For example, when a dithering signal is superimposed on an optical signal, a phase error may periodically vary with respect to time due to residual frequency offset. Upon detection of periodic variation in the phase error, the optical receiver 20 shortens the control cycle in which a frequency of the local oscillation light is controlled. Consequently, the frequency offset is precisely corrected, thereby improving the data error rate.

As in the case of the first embodiment, in the second embodiment, the averaging time of frequency offset estimation may be controlled in accordance with the phase error detected at the phase recovery 33. In this case, in accordance with an operation mode control signal provided by the operation parameter control circuit 36, the frequency offset estimator 31 controls the averaging time of frequency offset estimation and controls the control cycle in which a frequency of the local oscillation light is controlled.

<Third Embodiment>

In the first embodiment, the averaging time of frequency offset estimation is controlled according to a phase error detected at the phase recovery 33. By contrast, in the third embodiment, the averaging time of frequency offset estimation is controlled according to the number of FEC-error corrections of recovered data. In an optical communication system in accordance with the third embodiment, data is transmitted after being stored in a packet or a frame to which FEC is added.

As described above, a bit error rate is degraded when a phase error detected at the phase recovery 33 varies remarkably. For example, as illustrated in FIG. 9A, a bit error rate is periodically degraded when a dithering signal is superimposed on an optical signal and the averaging time of frequency offset estimation is long. In this case, the number of FEC-error corrections of recovered data also periodically changes. Thus, control that is similar to the control in the first embodiment may be achieved by monitoring the number of FEC-error corrections of recovered data instead of directly monitoring a phase error.

Figure 14:
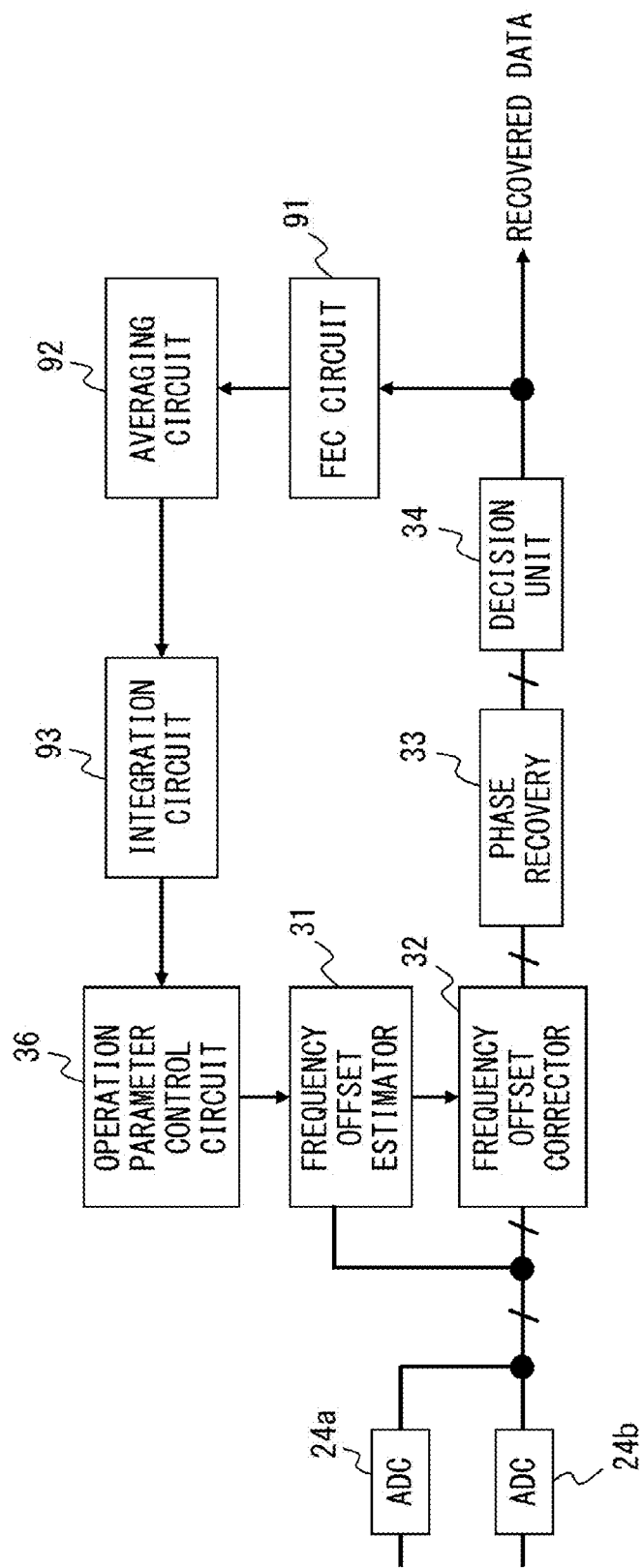
FIG. 14 illustrates the configuration of an optical receiver in accordance with a third embodiment.
Figure 15:
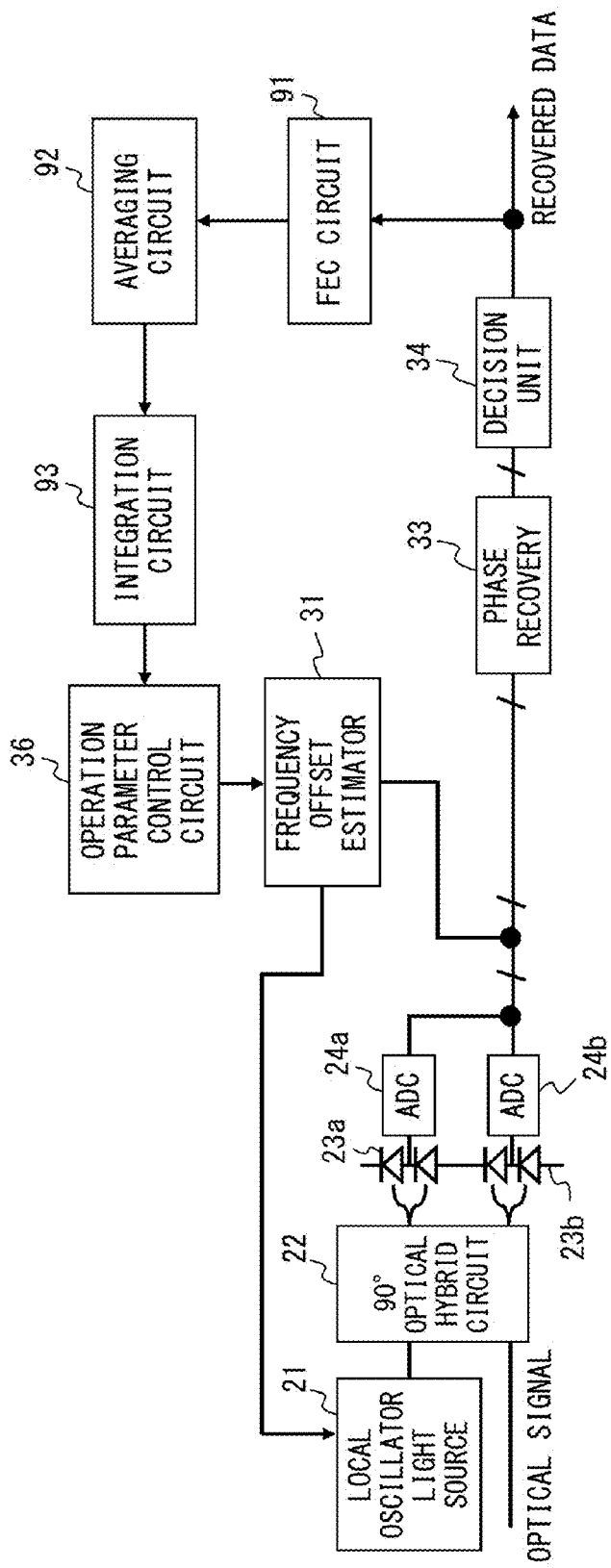
FIG. 15 illustrates the configuration of an optical receiver in accordance with a fourth embodiment.

FIG. 14 illustrates the configuration of an optical receiver in accordance with the third embodiment. Note that the local oscillator light source 21, the 90-degree optical hybrid circuit 22, and the photodetectors 23a and 23b are omitted in FIG. 14.

A DSP 25 includes the frequency offset estimator 31, the frequency offset corrector 32, the phase recovery 33, the decision unit 34, the operation parameter control circuit 36, an FEC circuit 91, an averaging circuit 92, and an integration circuit 93. The frequency offset estimator 31, the frequency offset corrector 32, the phase recovery 33, and the decision unit 34 are substantially the same in the first and third embodiments, thus descriptions of them are omitted.

The FEC circuit 91 performs an FEC process for recovered data and detects the number of FEC-error corrections. The averaging circuit 92 calculates the average number of FEC-error corrections. The integration circuit 93 generates a first integration value by integrating the deviation relative to the average number of FEC-error corrections. The integration circuit 93 also generates a second integration value by integrating the absolute value of the deviation relative to the average number of FEC-error corrections. Note that the processes of generating first and second integration values for the number of FEC-error corrections are substantially the same as the processes of generating first and second integration values for a phase error in the first embodiment.

The other processes are substantially the same in the first and third embodiments. That is, the operation parameter control circuit 36 controls the averaging time of frequency offset estimation according to the first and second integration values for the number of FEC-error corrections. The frequency offset estimator 31 estimates frequency offset with the averaging time specified by the operation parameter control circuit 36.

<Fourth Embodiment>

In the second embodiment, the control cycle in which a frequency of a local oscillation light is controlled is controlled according to the phase error detected at the phase recovery 33. By contrast, in the fourth embodiment, the control cycle in which a frequency of a local oscillation light is controlled is controlled according to the number of FEC-error corrections of recovered data. Note that, in the optical communication system in accordance with the fourth embodiment, data is also transmitted after being stored in a packet or a frame to which FEC is added.

In the optical receiver 20 in accordance with the fourth embodiment, the processes performed by the FEC circuit 91, the averaging circuit 92, and the integration circuit 93 are substantially the same as those in the third embodiment. The processes performed by the operation parameter control circuit 36 and the frequency offset estimator 31 to control the local oscillator light source 21 are substantially the same as those in the third embodiment.

<Another Embodiment>

When a periodic change in frequency offset is not detected, the optical receiver 20 may decide that a dithering signal is not superimposed on an optical signal. Thus, only when a periodic change in frequency offset is detected, the optical receiver 20 may perform the processes of the flowchart illustrated in FIG. 10 or FIG. 13.

When the optical receiver 20 detects a periodic change in frequency offset, the optical receiver 20 may report this fact to the optical transmitter 10. This report is achieved by, for example, using an available bit in an FEC region of a packet or a frame transmitted from the optical receiver 20 to the optical transmitter 10. Alternatively, the report may be achieved using the optical frequency that propagates from the optical receiver 20 to the optical transmitter 10. In this case, in accordance with the report from the optical receiver 20, the optical transmitter 10 may control an operation to generate an optical signal. Using a master/slave scheme, the optical transmitter 10 and the optical receiver 20 may share information indicating the frequency of the optical transmitter 10.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical receiver comprising:
    a frontend circuit configured to generate a baseband signal representing a received optical signal by using local oscillator light;
    a frequency offset estimator configured to estimate a frequency offset of the baseband signal;
    a frequency offset corrector configured to correct the frequency offset of the baseband signal according to an estimation result by the frequency offset estimator;

a phase recovery configured to recover a modulated phase from the baseband signal for which the frequency offset is corrected;

a data recovery configured to recover transmission data according to the modulated phase recovered by the phase recovery; and a controller configured to control an operation of the frequency offset estimator according to a phase error of the baseband signal for which the frequency offset is corrected, wherein the controller includes
- a first calculator configured to generate a first integration result by integrating the phase error,
- a second calculator configured to generate a second integration result by integrating an absolute value of the phase error, and
- an estimation time controller configured to control an estimation time of the frequency offset estimator according to a difference between the first and second integration results.

2. The optical receiver according to claim 1, wherein the controller shortens an estimation time of the frequency offset estimator when the phase error periodically changes with respect to time.

3. The optical receiver according to claim 1, wherein the estimation time controller shortens the estimation time when the difference between the first and second integration results is greater than a specified threshold, and extends the estimation time when the difference between the first and second integration results is less than the threshold.

4. An optical receiver comprising:

a frontend circuit configured to generate a baseband signal representing a received optical signal by using local oscillator light;

a frequency offset estimator configured to estimate a frequency offset of the baseband signal;

a frequency offset corrector configured to correct the frequency offset of the baseband signal according to an estimation result by the frequency offset estimator;

a phase recovery configured to recover a modulated phase from the baseband signal for which the frequency offset is corrected;

a data recovery configured to recover transmission data according to the modulated phase recovered by the phase recovery; and a controller configured to control an estimation time of the frequency offset estimator according to a phase error of the baseband signal for which the frequency offset is corrected, wherein the frequency offset estimator includes
- a detector configured to detect an amount of a phase change between symbols for each symbol, and
- an estimator configured to estimate the frequency offset by calculating an average of the amount of a phase change detected by the detector for a plurality of symbols received during a period of the estimation time controlled by the controller.

5. A frequency offset correction method, comprising:

estimating a frequency offset of a baseband signal, generated by using local oscillator light, representing a received optical signal;

correcting the frequency offset of the baseband signal according to the estimated frequency offset; and controlling an estimation time of a process of estimating the frequency offset according to a phase error of the baseband signal for which the frequency offset is corrected, the phase error indicating a difference between a phase of carrier light of the received optical signal and a phase of the local oscillator light, wherein in the controlling process:
- a first integration result is generated by integrating the phase error,
- a second integration result is generated by integrating an absolute value of the phase error, and
- the estimation time is controlled according to a difference between the first and second integration results.

* * * * *